United States Patent
Li et al.

(10) Patent No.: US 11,708,514 B2
(45) Date of Patent: Jul. 25, 2023

(54) SOLVENT FREE LIQUID MOISTURE CURABLE POLYURETHANE COMPOSITIONS WITH LONG OPEN TIMES AND FAST CURE RATES

(71) Applicant: Henkel AG & Co. KGaA, Duesseldorf (DE)

(72) Inventors: Yingjie Li, Elgin, IL (US); Shuhui Qin, Elgin, IL (US); Jeanne Li, Elgin, IL (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/817,940

(22) Filed: Mar. 13, 2020

(65) Prior Publication Data
US 2020/0216728 A1 Jul. 9, 2020

Related U.S. Application Data

(63) Continuation of application No. PCT/US2018/052167, filed on Sep. 21, 2018.

(60) Provisional application No. 62/561,759, filed on Sep. 22, 2017.

(51) Int. Cl.
| | | |
|---|---|---|
| C09J 175/04 | (2006.01) | |
| C08G 18/32 | (2006.01) | |
| C08G 18/76 | (2006.01) | |
| C09J 11/06 | (2006.01) | |
| C09J 11/08 | (2006.01) | |

(52) U.S. Cl.
CPC ........ *C09J 175/04* (2013.01); *C08G 18/3203* (2013.01); *C08G 18/7664* (2013.01); *C09J 11/06* (2013.01); *C09J 11/08* (2013.01)

(58) Field of Classification Search
CPC ... C09J 175/04; C09J 175/08; C08G 18/4845; C08G 18/4841; C08G 18/4829
See application file for complete search history.

(56) References Cited

U.S. PATENT DOCUMENTS

| | | | |
|---|---|---|---|
| 8,349,988 B2 | 1/2013 | Song et al. | |
| 9,579,869 B2 | 2/2017 | Qin et al. | |
| 2010/0078117 A1* | 4/2010 | Stanjek | C08J 9/142 156/79 |
| 2015/0203728 A1* | 7/2015 | Burckhardt | C08G 18/222 156/331.7 |
| 2015/0259465 A1 | 9/2015 | Burckhardt et al. | |
| 2016/0312091 A1* | 10/2016 | Krishnamoorthy | C08G 65/33348 |
| 2018/0051122 A1* | 2/2018 | Sophiea | C08G 18/168 |

FOREIGN PATENT DOCUMENTS

| | | | |
|---|---|---|---|
| CA | 2482397 A1 | 4/2005 | |
| CN | 101679575 A | 3/2010 | |
| CN | 104640894 A | 5/2015 | |
| CN | 104804700 A | 7/2015 | |
| CN | 106103525 A | 11/2016 | |
| CN | 106189992 A | 12/2016 | |
| EP | 2949676 A1 * | 12/2015 | ............. C08G 18/10 |
| WO | 2009070293 A1 | 6/2009 | |
| WO | WO-2015100128 A1 * | 7/2015 | ......... C08G 18/4841 |
| WO | 2017103070 A1 | 6/2017 | |

OTHER PUBLICATIONS

Written Opinion of the International Searching Authority for PCT/US2018/052167, (dated Year: 2019).*
International Search Report for International PCT Patent Application No. PCT/US2018/052167 dated Dec. 12, 2018.
Handbook of Raw Materials and Additives for Polyurethanes, Edited by Liu Yijun, Chemical Industry Press, published in Nov. 2012. p. 30.
Aromatic Engineering, Editors-in-chief: Zhao Rendian, etc., Chemical Industry Press, published in Aug. 2001. p. 646.

* cited by examiner

*Primary Examiner* — Michael M Dollinger
(74) *Attorney, Agent, or Firm* — James E. Piotrowski

(57) ABSTRACT

Disclosed is a liquid, solvent free, moisture curable polyurethane adhesive composition comprising the reaction products of at least one polyoxypropylene polyol having a hydroxyl functionality of at least three and ethylene oxide end-capping with one or more polyisocyanates having a weight average isocyanate functionality of greater than 2.3. The adhesive composition has a long open time and rapid cure time compared to currently available adhesives. The polyoxypropylene polyol preferably has a number average molecular weight of from 3,000 to 8,000. The composition finds special use in panel lamination applications.

18 Claims, No Drawings

SOLVENT FREE LIQUID MOISTURE CURABLE POLYURETHANE COMPOSITIONS WITH LONG OPEN TIMES AND FAST CURE RATES

TECHNICAL FIELD

This disclosure relates generally to moisture curable polyurethane compositions and more particularly to such compositions having long open times and fast cure times to produce high initial green strength.

BACKGROUND OF THE INVENTION

This section provides background information which is not necessarily prior art to the inventive concepts associated with the present disclosure.

In the field of moisture curable adhesive compositions it is desirable to have open times that are sufficiently long to allow for assembly of the parts of a structure being glued together and then you want a fast cure time once the structure is assembled. The fast cure time is desirable so that the structure can be handled and further processed on a production line. In addition, it is desirable to develop adhesive compositions that do not require the use of solvents. One problem with developing an adhesive having a long open time and a fast initial cure rate is that the two are directly related to each other meaning a long open time is associated with a long cure time. Past solutions have tried to speed up cure time by adding more cure catalyst; however this reduces open time to an unacceptable level. Other approaches to increasing cure speed without sacrificing open time are to use an energy curing process or a heated curing process. Use of heated curing processes is limited to substrates that are good heat conductors and requires a significant capital investment. Energy curing requires many changes to existing processes and significant capital investment. Other solutions have involved the use of additional press stations in panel lamination plants to increase productive throughput, again requiring a significant capital investment. Finally, others have tried using multiple products with differing open and cure times in an attempt to increase productivity; however this approach has not been successful to date. Another problem is that the open time and cure time can be affected by plant temperature so in the past some manufacturers have resorted to using a "summer" formula to deal with the shortened open time caused by higher summer temperatures and the resulting faster cure speed and a "winter" formula having more catalyst to deal with the opposite problems caused by the lower winter temperatures. This is unsatisfactory because it requires creating 2 formulas and deciding each year when to make the switch from one formula to the other. Finally, some manufacturers have gone to a slow cure line and a fast cure line, again a significant capital investment. None of these are acceptable solutions.

It is desirable to provide an adhesive formulation having a long open time and a short cure time that does not add to costs, space or other requirements and which can be used with existing processes.

SUMMARY OF THE DISCLOSURE

This section provides a general summary of the disclosure and is not a comprehensive disclosure of its full scope or all features, aspects or objectives.

In one embodiment, the disclosure is a liquid, solvent free, moisture curable polyurethane adhesive composition comprising the reaction products of: at least one polyoxypropylene polyol having a hydroxyl functionality of from 3.0 to about 4.5 and ethylene oxide end-capping; and one or more polyisocyanates, wherein the one or more polyisocyanates have a combined weight average isocyanate functionality of from 2.3 to about 3.3, preferably at least 2.4 and more preferably at least 2.5.

In at least one embodiment, the at least one polyoxypropylene polyol is present in an amount of from 20 to 80% by weight based on the total weight of the composition.

In at least one embodiment the at least one polyoxypropylene polyol is present in an amount of from 30 to 60% by weight based on the total weight of the composition.

In at least one embodiment the one or more polyisocyanates is present in an amount of from 20 to 80% by weight based on the total weight of the composition.

In at least one embodiment the one or more polyisocyanates is present in an amount of from 30 to 60% by weight based on the total weight of the composition.

In at least one embodiment the at least one polyoxypropylene polyol has a number average molecular weight of from 3,000 to 8,000.

In at least one embodiment the at least one polyoxypropylene polyol has a number average molecular weight of from 3,500 to 6,500.

In at least one embodiment the composition further comprises at least one mineral or aromatic oil.

In at least one embodiment the composition further comprises at least one acid.

In at least one embodiment the at least one oil is present in an amount of from 1 to 10 weight % based on the total composition weight.

In at least one embodiment the at least one acid is present in an amount of from 0.005 to 0.8 weight % based on the total composition weight.

In at least one embodiment the one or more polyisocyanates have a weight average isocyanate functionality of 2.5 or greater.

In at least one embodiment the composition further comprises as a catalyst 2,2'-dimorpholinodiethylether.

In at least one embodiment the one or more polyisocyanates comprises polymeric MDI or a mixture of polymeric MDI and MDI.

In at least one embodiment the polyurethane adhesive composition is a single component composition. In another embodiment, the polyurethane adhesive composition is a two-component composition wherein the components are stored separately and mixed immediately prior to use.

In at least one embodiment the one or more polyisocyanates having a weight average isocyanate functionality of 2.4 or greater.

In at least one embodiment the composition further comprises at least one acid and at least one mineral or aromatic oil.

In at least one embodiment the composition further comprises at least one acid, at least one mineral or aromatic oil and the catalyst 2,2'-dimorpholinodiethylether.

In at least one embodiment the disclosure is a process of bonding substrates comprising providing a liquid, solvent free, moisture curable polyurethane adhesive composition comprising the reaction products of at least one polyoxypropylene polyol having a hydroxyl functionality of from 3.0 to about 4.5 and ethylene oxide end-capping; and one or more polyisocyanates, wherein the one or more polyisocyanates having a weight average isocyanate functionality of from 2.3 to about 3.3 and preferably at least 2.5 and disposing the liquid, solvent free, moisture curable polyurethane adhesive composition on a substrate.

In at least one embodiment the disclosure is an assembly including a liquid, solvent free, moisture curable polyurethane adhesive composition comprising the reaction products of at least one polyoxypropylene polyol having a hydroxyl functionality of from 3.0 to about 4.5 and ethylene oxide end-capping; and one or more polyisocyanates, wherein the one or more polyisocyanates having a weight average isocyanate functionality of from 2.3 to about 3.3 and preferably at least 2.5.

These and other features and advantages of this disclosure will become more apparent to those skilled in the art from the detailed description of a preferred embodiment. The drawings that accompany the detailed description are described below.

DETAILED DESCRIPTION OF A PREFERRED EMBODIMENT

The following terms as used in the present specification and claims have the meanings as defined herein. The "open time" of an adhesive composition is defined as the time interval starting after application of an adhesive to a first surface and ending when the adhesive composition is no longer capable of the desired wet-out and transfer to another surface. Once an "open time" has been exceeded for a composition it is no longer commercially usable. The term "wet out" refers to the ability of an adhesive composition to flow and cover a surface it is applied to, thereby maximizing adhesive coverage and contact area. The term "assembly time" refers to the time from the first deposit of the adhesive composition onto a surface until it is placed in a press. The term "press time" refers to the time during which an assembly is in a press to ensure complete coverage and sufficient initial cure to allow for further handling of the assembly. In the panel lamination industry, another common term is "cycle time" which refers to the sum of the assembly time and the press time.

The liquid moisture curable polyurethane adhesive compositions comprise polyurethane pre-polymer reaction products formed from a reaction mixture of one or more polyols and an excess of one or more polyisocyanates. Catalyst can be used to control the cure speed of these adhesive compositions. Other additives can be included to control rheology and other processing properties. These adhesives cure in the presence of moisture either from the atmosphere or as added by an operator using a misting spray application of the moisture. The cured adhesive forms a polyurethane urea crosslinked network with $CO_2$ given off as a byproduct of the curing process. The structural bonds formed from these adhesives have good heat resistance, chemical resistance, a wide adhesion spectrum, are free from solvents and can usually be applied at room temperature. The polyurethane adhesive composition according to the present disclosure can comprise a single component composition. Alternatively, and more preferably the adhesive composition according to the present disclosure can comprise a two-component composition wherein the components are stored separately and mixed immediately prior to use. Mixing of the two components starts a cure reaction so storage after mixing is not possible.

Liquid moisture curable polyurethane adhesive compositions find special use in panel lamination applications. In a typical panel lamination process the assembly includes two "skins" laminated to opposing sides of a core. The skins can comprise, for example, wood or wood products, plastics, fiber reinforced plastics (FRP), metals or metal foils, high pressure laminate (HPL) skins, or other planar materials. The core can comprise. for example, one or more structural members that can be arranged as a frame; foam sheet such as an expanded polystyrene (EPS) foam sheet; metal, paper or synthetic honeycomb sheet; wood and wood products; or a combination of these materials. A typical panel lamination process includes at least three steps: assembly of the parts to be laminated together with the adhesive, placing the assembled parts in a press, and routing or stocking of the parts from the press after the initial cure of the adhesive. During the assembly step the adhesive composition is deposited onto at least one of the lamination layers and then it is misted with water. Then another lamination layer is placed over the misted adhesive. For multiple layers this process is repeated until the final lamination stack has been assembled. Then the final lamination stack is moved to a press station wherein the press applies pressure to the lamination stack and the adhesive can develop its initial strength through an initial cure, i.e. develops green strength, as is known in the industry. Once sufficient initial or green strength is developed the lamination stack is moved out of the press and routed to the next station. One of the current drawbacks in adhesive compositions is their slow initial strength or green strength development speed. One must allow for sufficient adhesive strength to develop before removing the assembly from the press so that the assembly stays together during movement. This means the press times are extended which slows production rates. The ideal adhesive composition would have an open time that is sufficient to allow for the needed assembly time and a press time to develop initial strength that is instantaneous. In reality, for current adhesives the open time is long enough for any required assembly but the press time is too long and undesirably slows the process time. In addition, long process times are also influenced by the time of year with the cooler winter temperatures slowing adhesive cure and strength development and additionally slowing process times.

The present adhesive composition solves these issues by creating a solvent free, liquid, moisture curable polyurethane adhesive composition that has a sufficiently long open time and a fast initial cure time (short time to develop green strength). The adhesive composition is created by reacting at least one polyoxypropylene polyol having ethylene oxide end-capping and a hydroxyl functionality of from 3.0 to about 4.5 and polyisocyanates having a weight average functionality of at least 2.3 to about 3.3. Preferably the polyisocyanates have a functionality of 2.5 or greater. Optional additional components in the adhesive composition include mineral oils and acids to aid in stability, rheology and curing of the composition. The disclosed adhesive composition exhibits a quick cure time and rapidly develops green strength at a level higher than previously achieved. Surprisingly, the composition does not exhibit early gelling and maintains useful, long open time. The composition finds special use in panel lamination processes, such as for example a recreational vehicle assembly process.

It is possible to use a mixture of polyols in the adhesive composition. Thus, the polyol mixture can include a non-polyoxypropylene polyol or a polyoxypropylene polyol that are not ethylene oxide end-capped or a polyoxypropylene polyol having a hydroxyl functionality outside the range of 3.0 to about 4.5 as long as at least one of the polyols in the polyol mixture is a polyoxypropylene polyol having ethylene oxide end-capping and a hydroxyl functionality of from 3.0 to about 4.5. Preferably, all of the polyols used in the adhesive composition, either singly or in a polyol mixture, are polyoxypropylene polyols with ethylene oxide end-capping and a hydroxyl functionality of 3.0 to about 4.5. Acceptable polyoxypropylene polyols with ethylene oxide end-capping and a hydroxyl functionality of 3.0 to about 4.5 include those having a number average molecular weight of 3,000 to 8,000, more preferably from 3,500 to 6,500. Preferably the polyoxypropylene polyol with ethylene oxide end-capping is present in the adhesive composition at a level of from 20 to 80% by weight based on the total composition weight, more preferably from 30 to 60% by weight.

The suitable polyisocyanates include one or more polyisocyanates wherein the weight average functionality of the one or more polyisocyanates is at least 2.3 to about 3.3, preferably 2.4 or greater, and more preferably 2.5 or greater. The weight average functionality of a mixture of polyisocyanates (fNCO) is calculated as follows: fNCO=(wt % NCO1*fNCO1)+(wt % NCOi*fNCOi)+ . . . . In other words, the weight average functionality is the sum of each weight % of a given polyisocyanate based on the total polyisocyanate weight percentage multiplied by its functionality. For example, an adhesive composition containing 30 wt. %, based on the total composition weight, of a polyisocyanate having functionality of 2.7 and 15 wt. %, based on the total composition weight, of a polyisocyanate having a functionality of 2.0 yields a weight average functionality of (30/(30+15))*2.7+(15/(30+15))*2=2.47. The polyisocyanate(s) are preferably present in the adhesive composition in an amount of from 20 to 80% by weight based on the total adhesive composition weight, more preferably from an amount of 30 to 60% by weight. Polyisocyanates can be used alone if their functionality is at least 2.3 to about 3.3, preferably 2.4 or greater and more preferably 2.5 or greater. Polyisocyanates can be used in combination to achieve a functionality of at least 2.3 to about 3.3, preferably 2.4 or greater and more preferably 2.5 or greater. Useful polyisocyanates include diisocyanates such as 4,4'-diphenylmethane diisocyanate (4,4' MDI); toluene diisocyanate; 1,4-diisocyanatobenzene (PPDI); 2,4'-diphenylmethane diisocyanate; 1,5-naphthalene diisocyanate; polymeric MDI; bitolylene diisocyanate; 1,3-xylene diisocyanate; p-TMXDI; 1,6-diisocyanato-2,4,4-trimethylhexane; CHDI; BDI; $H_6$XDI; IPDI; $H_{12}$MDI, and the like.

The disclosed adhesive compositions can include liquid oils such as mineral oils, paraffin oils, and aromatic oils. Many liquid paraffinic oils and aromatic oils can be used such as n-paraffinic oils, iso-paraffinic oils and other branched paraffins, cycloparaffins (naphthenes), condensed cycloparaffins (including steranes and hopanes), and others with alkyl side chains on ring systems. The paraffinic oil may be a 100% n-alkanes based paraffinic oil, with a molecular formula $CH_3[CH_2]_nCH_3$. This paraffinic oil is also called liquid paraffin, white mineral oil or liquid petrolatum. Commercially available examples of the paraffinic oil include those under the trade name Citation™ NF grade from Avatar Corporation. Aromatic oils suitable for use herein include oils which contain at least one ring that has a conjugated pi-electron system with (4n+2)pi electrons, where n is an integer such as 0, 1, or 2. Such aromatic oils include those aromatic hydrocarbons containing benzene systems, condensed aromatic systems, condensed aromatic cycloalkyl systems, and others with alkyl side chains on ring systems. An example of an aromatic oil useful herein is a complex mixture of 100% aromatic hydrocarbons, commercially available under the trade name Viplex®, and Vycel® from Crowley Chemical Company, and Shellflex® from Shell Company. More information generally about liquid paraffinic oils and aromatic oils can be found in "The Chemistry and Technology of Petroleum", 4th Edition by James Speight, CRC Press, the disclosure of which is expressly incorporated herein by reference. The oils can be present in an amount of from 1 to 10% by weight based on the total composition weight, more preferably from 3 to 8% by weight.

The disclosed adhesive compositions can include additives such as acids. Suitable acids include organic and inorganic acids such as phosphoric acid, trifluoromethane sulfonic acid, methane sulfonic acid and ethane sulfonic acid, in an amount of from 0.005 to 0.8 wt. % based on the total composition weight.

The catalyst can be any moisture curing catalyst for isocyanates, for example 2,2'-dimorpholinodiethylether, triethylenediamine, dibutyltin dilaurate and stannous octoate. A preferred catalyst is the tertiary amine catalyst 2,2'-dimorpholinodiethylether. The catalyst is preferably present in an amount of from 0.02 to 3.5 wt. % based on the total composition weight.

Other common adhesive additives can be included such as, for example, colorants, UV pigments, fillers, plasticizer, rheology modifiers and combinations thereof.

The adhesive composition according to the present disclosure is free from any solvents in any stage of the formulation.

Experimental Data

The experimental adhesive compositions discussed herein and show below in Table 1 were created using a glass reactor equipped with agitation, nitrogen supply, vacuum capacity, and heating and cooling steps. The general reaction process for each example was as follows. First, approximately half of the polyol(s) were added to the reaction vessel. Then the polyisocyanate(s), oil and phosphoric acid were added to the reaction vessel. Next the mixture was heated to 70° C. with agitation and allowed to react for 40 minutes. Then the rest of the polyol(s) were added and the reaction was allowed to proceed with agitation for an additional 80 minutes. The reaction mixture was then cooled to below 60° C. and the Jeffcat® DMDEE catalyst was added. The reaction was allowed to proceed at 60° C. for 10 minutes with agitation. Finally, the reaction product(s) were drawn off to a metal storage vessel with a nitrogen blanket.

The viscosity of the products, in centipoise (cP), was measured at 25° C. using a Brookfield viscometer model DV-1 Prime. The NCO % was monitored using a Brinkman Metrohm automatic titrator. The open time of each composition was measured using a plywood Lauan substrate. An adhesive bead was deposited onto the Lauan at a level of approximately 10 g/ft$^2$ and misted with water at a level of 1.5 g/ft$^2$. A timer was started and then a tongue depressor was used to test how the adhesive spread both on the Lauan and the tongue depressor. When only partial spread was seen and when "strings" were observed as the tongue depressor was lifted the open time was considered ended, the timer was stopped and the open time was recorded. The press times noted below are the time the laminate stack was in a press under a pressure of about 28 inches of Hg using a vacuum press from Vacuum Pressing Systems, Inc. a VACU Press Compact 150. The press was not heated and all curing was done at room temperature. The cross-peel strength, initial green strength, was measured after an assembly time of 2 minutes and a press time of 17 minutes as described above using hardwood substrates and a cross-peel tester from Bandit Machine. The reported numbers are the average of at least nine repetitions.

The characteristics of the compounds used in the described experimental formulations are as follows. Arcol®

PPG 4000 is a polyoxypropylene glycol diol, hydroxyl functionality of 2, with a molecular weight of 4,000 and is available from Covestro. Arcot® PPG 2000 is a polyoxypropylene glycol diol, hydroxyl functionality of 2, with a molecular weight of 2,000 and is available from Covestro. Amor) E351 is a polyoxypropylene diol, hydroxyl functionality of 2, with ethylene oxide end-capping, a molecular weight of 2,800 and is available from Covestro. Multranol® 3901 is a polyoxypropylene triol, hydroxyl functionality of 3, with ethylene oxide end-capping, a molecular weight of 6,000 and is available from Covestro. Acclaim® polyol 6300 is a polyoxypropylene triol, hydroxyl functionality of 3, without ethylene oxide end-capping, a molecular weight of 6,000 and is available from Covestro. 4,4'-methylene diphenyl diisocyanate (4,4'-MDI) has a functionality of 2 and was obtained from Covestro. Rubinate® M from Huntsman is a polymeric MDI having 31.0% NCO, a functionality of 2.70 and an equivalent weight of 135. 2,2'-dimorpholinodiethylether (available as Jeffcat® DMDEE from Huntsman Corp.) is a tertiary amine catalyst. Citation™ 70 NF is a white mineral oil available from Avatar Corp.

The formulations of the examples are provided below in TABLE 1. Examples 2, 4, 8, and 10 were prepared according to the present disclosure while examples 1, 3, 5-7, 9 and 11-12 are comparative examples. All amounts are in weight % based on the total composition weight. TABLE 2 discloses properties for the exemplified formulations as well as for a commercially available moisture curable polyurethane adhesive (Loctite® UR 8346RD available from Henkel Corp.).

TABLE 1

| Example | 1 | 2 | 3 | 4 | 5 | 6 | 7 | 8 | 9 | 10 | 11 | 12 |
|---|---|---|---|---|---|---|---|---|---|---|---|---|
| Multranol® 3901 | 0 | 49.2 | 50.4 | 54.0 | 0 | 0 | 50.0 | 48.9 | 0 | 49.2 | 0 | 0 |
| PPG 4000 | 17.5 | 0 | 0 | 0 | 16.0 | 0 | 0 | 0 | 0 | 0 | 17.4 | 0 |
| PPG 2000 | 34 | 0 | 0 | 0 | 31 | 0 | 0 | 0 | 0 | 0 | 34.5 | 0 |
| Acclaim® 6300 | 0 | 0 | 0 | 0 | 0 | 49.2 | 0 | 0 | 53.91 | 0 | 0 | 0 |
| Arcol® E351 | 0 | 0 | 0 | 0 | 0 | 0 | 0 | 0 | 0 | 0 | 0 | 52.2 |
| 4,4' MDI | 0 | 12.3 | 44 | 12.3 | 0 | 12.3 | 31.3 | 0 | 12.3 | 12.3 | 12.9 | 0 |
| Polymeric MDI | 48 | 33 | 0 | 33.2 | 47.5 | 33 | 13.1 | 45.6 | 33.2 | 33 | 34.6 | 47.4 |
| Oil 70 NF | 0 | 5 | 5 | 0 | 5 | 5 | 5 | 5 | 0 | 5 | 0 | 0 |
| Phosphoric acid | 0.06 | 0.06 | 0.06 | 0.06 | 0.06 | 0.06 | 0.06 | 0.06 | 0.06 | 0 | 0.06 | 0.06 |
| Jeffcat® DMDEE | 0.46 | 0.49 | 0.49 | 0.49 | 0.5 | 0.49 | 0.49 | 0.46 | 0.53 | 0.46 | 0.49 | 0.48 |
| fNCO | 2.7 | 2.5 | 2.0 | 2.5 | 2.7 | 2.5 | 2.2 | 2.7 | 2.5 | 2.5 | 2.5 | 2.7 |
| fOH | 2 | 3 | 3 | 3 | 2 | 3 | 3 | 3 | 3 | 3 | 2 | 2 |
| EO endcapping | no | yes | yes | yes | no | no | yes | yes | no | yes | no | yes |

TABLE 2

| Example | Appearance | Viscosity 25° C. (cP) | NCO % theoretical | Open time (minutes) | green tensile strength (psi) |
|---|---|---|---|---|---|
| 1 comparative | Slightly cloudy | 9950 | 13.71 | 8 | 21 |
| 2 according to disclosure | Clear | 4125 | 13.76 | 8 | 58 |
| 3 comparative | Very cloudy | 1000 | 13.72 | 8 | 5 |
| 4 according to disclosure | Clear | 6275 | 13.73 | 8 | 79 |
| 5 comparative | Cloudy | 6025 | 13.70 | 8 | 11 |
| 6 comparative | Very cloudy | 4050 | 13.76 | 8 | 12 |
| 7 comparative | Clear | 1750 | 13.70 | 8 | 7 |
| 8 according to disclosure | Cloudy | 7375 | 13.71 | 8 | 70 |
| 9 comparative | Very cloudy | 6750 | 13.73 | 8 | 24 |
| 10 according to disclosure | Slightly cloudy | 3575 | 13.76 | 8 | 51 |
| 11 comparative | Clear | 5575 | 13.70 | 8 | 12 |
| 12 comparative | Clear | 8125 | 13.71 | 8 | 21 |
| Loctite® UR 8346RD | Clear | 4920 | 11.1 | 8 | 11 |

Examples 2, 4, 8 and 10 are prepared in accordance with the present disclosure and examples 1, 3, 5-7, 9, 11 and 12, along with Loctite® UR 8346RD, are comparative examples. Examples 2, 4, 8 and 10 were all prepared using as the polyol Multranol® 3901, which is a polyoxypropylene triol, hydroxyl functionality of 3, having ethylene oxide end-capping and a molecular weight of 6,000. Examples 2, 4 and 10 were prepared with a mixture of 4,4' MDI and polymeric MDI while example 8 was prepared using only polymeric MDI. Example 4 had no mineral oil and example 10 had no phosphoric acid. Comparative example 1 was prepared using a mixture of PPG 2000 and PPG 4000 which are both diols, no mineral oil and a polyisocyanate functionality of 2.7. Comparative example 3 was prepared using Multranol® 3901 and 4,4' MDI, however the polyisocyanate functionality was only 2.0, which is less than 2.3. Comparative example 5 is similar to comparative example 1 and was prepared using PPG 2000 and PPG 4000 as polyols and further including mineral oil. Comparative example 6 used Acclaim® 6300 which is a polyoxypropylene triol having a hydroxyl functionality of 3, however it had no ethylene oxide end-capping and has a molecular weight of 6,000. Comparative example 7 used Multranol® 3901 and a mixture of 4,4' MDI and polymeric MDI, however the polyisocyanate functionality was only 2.2. Comparative example 9 is similar to comparative example 6 and also used Acclaim® 6300 as the polyol, however it had no oil. Comparative example 11 used a mixture of PPG 2000 and PPG 4000, a mixture of 4,4' MDI and polymeric MDI with a functionality of 2.5 and did not include oil. Comparative example 12 used Arcol® E351 which is a polyoxypropylene diol having a hydroxyl functionality of 2, with ethylene oxide end-capping and a molecular weight of 2,800.

The resulting adhesive compositions were then analyzed for appearance, viscosity, theoretical NCO %, open time and tensile strength. The initial green strength as determined by tensile strength was measured after 2 minutes of assembly time and 17 minutes of press time, as described above, (19 minutes total). The examples prepared according to the present disclosure varied in appearance from clear to cloudy as did the comparative examples. The examples prepared according to the present disclosure did not exhibit any premature or undesirable gelling. The viscosity of samples prepared according to the present disclosure are in the middle range of 3500 to 7500 cP and are very acceptable. The open time of all the samples according to the present disclosure was maintained at 8 minutes which is commercially acceptable and equivalent to the commercially available product. Surprisingly, examples according to the present disclosure had a green strength (51 to 79 psi) that was much higher than the commercially available product (11 psi), an increase of 4.6 to 7.2 fold. Thus, the disclosed examples have the same commercially usable open time as the commercial product but develop green strength (cure) more rapidly than the commercial product. Panels made using the disclosed adhesive compositions can be processed more quickly compared to panels made using the commercially available product. Without wishing to be held to any theory the inventors believe that the reaction product of a polyoxypropylene with ethylene oxide end-capping and a hydroxyl functionality of about 3.0 to 4.5 and a polyisocyanate having a functionality of at least 2.3 to about 3.3 are necessary to achieve the desired results. Adhesives made from reactants outside of these parameters do not provide the surprising combination of long open time and quick cure (high initial green strength). Comparative examples 1, 5 and 11 show that the polyoxypropylene polyol needs a hydroxyl functionality of at least 3, that ethylene oxide end-capping is necessary and that a polyisocyanate functionality of greater than 2.3 alone is not sufficient to increase the initial green strength. Comparative examples 3 and 7 show that use of a polyoxypropylene triol with a hydroxyl functionality of 3 and ethylene oxide end-capping alone is not sufficient in the absence of polyisocyanate functionality of greater than 2.3. Comparative examples 6 and 9, both of which used a polyoxypropylene triol with a molecular weight of 6,000 and polyisocyanate functionality of 2.5 but had no ethylene oxide end-capping on the polyoxypropylene polyol, also show that ethylene oxide end-capping is necessary. Finally, comparative example 12 shows that a polyoxypropylene polyol with ethylene oxide end-capping and a hydroxyl functionality of only 2 is not sufficient to increase the green strength to the levels seen in examples prepared according to the present disclosure.

The disclosed adhesive compositions represent a surprising and unexpected result and provides a composition having a maintained open time with a dramatically increased initial green strength. The disclosed adhesive compositions are an improvement over already good commercial products.

The foregoing disclosure has been described in accordance with the relevant legal standards, thus the description is exemplary rather than limiting in nature. Variations and modifications to the disclosed embodiment may become apparent to those skilled in the art and do come within the scope of the disclosure. Accordingly, the scope of legal protection afforded this disclosure can only be determined by studying the following claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

We claim:

1. A liquid, solvent free, moisture curable polyurethane adhesive composition comprising:
    an acid selected from phosphoric acid, trifluoromethane sulfonic acid, methane sulfonic acid and ethane sulfonic acid; and
    the reaction products of:
    a polyol component comprising at least one polyoxypropylene polyol having a hydroxyl functionality of from 3.0 to about 4.5 and ethylene oxide end-capping, wherein the polyol component is free of filler;
    optionally one or more polyols selected from the group consisting of a non-polyoxypropylene polyol or a polyoxypropylene polyol that is not ethylene oxide end-capped or a polyoxypropylene polyol having a hydroxyl functionality outside the range of 3.0 to about 4.5; and
    a polyisocyanate component comprising one or more polyisocyanates, wherein the one or more polyisocyanates have a weight average isocyanate functionality of from 2.3 to about 3.3.

2. The liquid, solvent free, moisture curable polyurethane adhesive composition of claim 1 wherein said one or more polyisocyanates having a weight average isocyanate functionality of at least 2.4 to about 3.3.

3. The liquid, solvent free, moisture curable polyurethane adhesive composition of claim 1 wherein said one or more polyisocyanates having a weight average isocyanate functionality of at least 2.5 to about 3.3.

4. The liquid, solvent free, moisture curable polyurethane adhesive composition of claim 1 wherein said at least one polyoxypropylene polyol is present in an amount of from 20 to 80% by weight based on the total weight of said composition.

5. The liquid, solvent free, moisture curable polyurethane adhesive composition of claim 1 wherein said at least one polyoxypropylene polyol is present in an amount of from 30 to 60% by weight based on the total weight of said composition.

6. The liquid, solvent free, moisture curable polyurethane adhesive composition of claim 1 wherein said one or more polyisocyanates is present in an amount of from 20 to 80% by weight based on the total weight of said composition.

7. The liquid, solvent free, moisture curable polyurethane adhesive composition of claim 1 wherein said one or more polyisocyanates is present in an amount of from 30 to 60% by weight based on the total weight of said composition.

8. The liquid, solvent free, moisture curable polyurethane adhesive composition of claim 1 wherein said at least one polyoxypropylene polyol has a number average molecular weight of from 3,000 to 8,000.

9. The liquid, solvent free, moisture curable polyurethane adhesive composition of claim 1 wherein said at least one polyoxypropylene polyol has a number average molecular weight of from 3,500 to 6,500.

10. The liquid, solvent free, moisture curable polyurethane adhesive composition of claim 1, further comprising liquid mineral oil, liquid aromatic oil, and combinations thereof.

11. The liquid, solvent free, moisture curable polyurethane adhesive composition of claim 1, comprising from 0.005 to 0.8 weight % based on the total composition weight of the acid.

12. The liquid, solvent free, moisture curable polyurethane adhesive composition of claim 1 wherein said one or more polyisocyanates comprises polymeric MDI or a mixture of polymeric MDI and MDI.

13. An assembly comprising the adhesive composition of claim 1.

14. An assembly comprising cured reaction products of the adhesive composition of claim 1.

15. The liquid, solvent free, moisture curable polyurethane adhesive composition of claim 1 wherein said composition is a two-component composition and wherein the two components are stored separately and combined immediately prior to use.

16. The liquid, solvent free, moisture curable polyurethane adhesive composition of claim 1 wherein said composition is a two-component composition and wherein the two components cannot be mixed and stored.

17. A liquid, solvent free, moisture curable polyurethane adhesive composition comprising the reaction products of:
  one or more polyisocyanates, wherein the one or more polyisocyanates have a weight average isocyanate functionality of from 2.3 to about 3.3; and
  at least one polyol, wherein all of the polyols in the reaction product are selected from the group consisting of polyoxypropylene polyol having a hydroxyl functionality of from 3.0 to about 4.5 and ethylene oxide end-capping; a non-polyoxypropylene polyol; a polyoxypropylene polyol that is not ethylene oxide end-capped; a polyoxypropylene polyol that is not ethylene oxide endcapped having a hydroxyl functionality outside the range of 3.0 to about 4.5; and combinations thereof;
wherein the adhesive composition is free of filler.

18. The liquid, solvent free, moisture curable polyurethane adhesive composition of claim 1 being free of filler.

* * * * *